June 19, 1962 J. F. JAMMET 3,040,117
PROCESS FOR MANUFACTURING PRIMARY DRY CELLS
Filed June 30, 1959
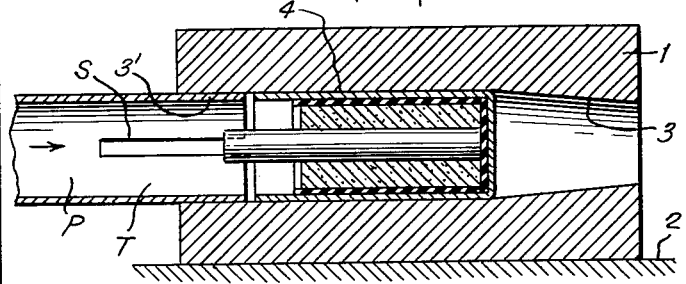
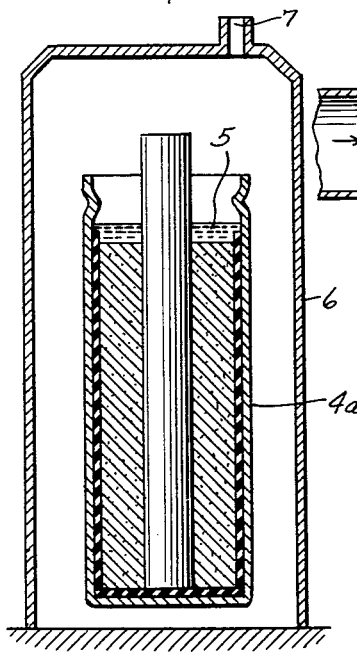
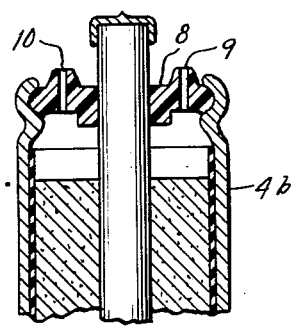
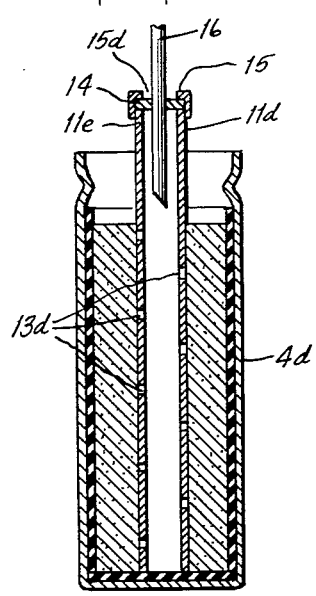
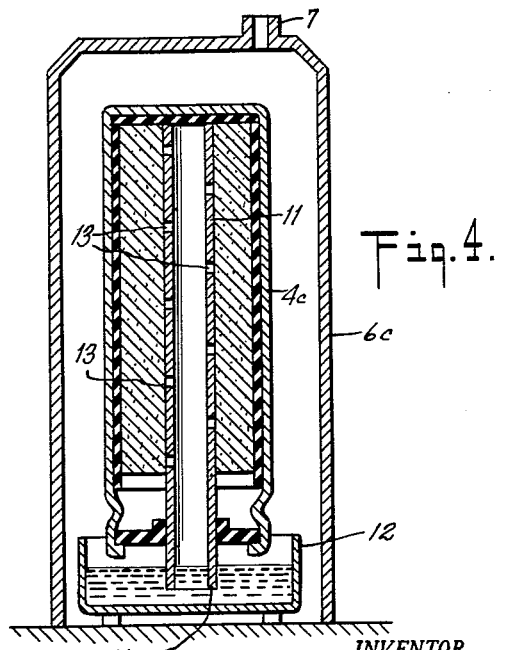
INVENTOR.
JEAN FIRMIN JAMMET
BY
ATTORNEYS

United States Patent Office

3,040,117
Patented June 19, 1962

3,040,117
PROCESS FOR MANUFACTURING PRIMARY DRY CELLS
Jean F. Jammet, Poitiers, France, assignor to Societe des Accumulateurs Fixes et de Traction (Societe Anonyme), Romainville, France, a French company
Filed June 30, 1959, Ser. No. 824,092
Claims priority, application France July 4, 1958
5 Claims. (Cl. 136—175)

The present invention relates to an improvement in the method of manufacturing dry cells, and more especially manganese-dioxide primary cells, and in the cells themselves.

The long experience which the manganese-dioxide cells manufacturers have acquired has enabled them to establish that, concerning the structure of the depolarizing mix, the following features or conditions are critical for obtaining high performance cells; a higher weight of active material for a given volume, a more highly compressed depolarizing mix, a closer engagement between the depolarizing material and the carbon, a more complete impregnation by the electrolyte.

Hitherto it has been the practice to compress the agglomerated depolarizing mixture and encase it in paper or linen laced with string windings, or more recently, the mixture has been compressed, and is merely positioned with the use of a cup-shaped paper container which however does not effectively encase the agglomerate. The disadvantages of these methods, are, in the first case, the expense of the casing, and in the second case, the agglomerate being often fragile and rough tends to short circuit with the metal case; while in both instances the subsequent insertion of the electrolyte between the agglomerate and the metal case is costly and inconvenient; and even when cold-jellification type electrolyte is used in these two methods, the aforementioned inconveniences and expenses remain.

Although every manufacturer has tried to comply with these various conditions in the best possible way, none of the processes as far as I am aware and so far proposed for making cylindrical dry cells has actually achieved the desired end, at least one of the above-mentioned conditions being lacking or unsatisfied.

It is believed that the new process described in the present invention constitutes the best solution to this problem up to the present time.

Principal objects and features of this invention are a process for manufacturing a preferably cylindrically shaped dry cell (although other cross-sectional shapes are contemplated), and more especially a cell having a manganese-dioxide mix or other core extending substantially axially and centrally or otherwise positioned, insulated from the bottom of the zinc or other metallic container or can and separated from the container's walls by an electrolyte impregnated sheet, characterized in that use is made of a conductive electrode functioning container shell such as one whose major chord or diameter is substantially larger than the corresponding dimensions of the conductive electrodes of conventional cells presently extant. After the mix has been placed in the container, the latter has its cross-sectional boundary or periphery and area reduced to the corresponding dimensions of the equivalent conventional cell, and the mix is thereafter impregnated by a determined amount of electrolyte preferably either under vacuum or by injection or in other suitable ways.

Other objects and features of the invention are the provision of novel dry cell of the character described resulting from this novel process of manufacture hereinafter to be described in detail.

Other objects and features of the invention will become apparent from the following description and the accompanying drawings forming a part hereof, wherein;

FIGURE 1 illustrates in diagrammatic cross-section, a mechanism for practicing the process of this invention.

FIGURES 2-5, inc. illustrate respectively in full or partial cross-section cells embodying the invention and diagrammatically different ways of impregnating cells of this character with electrolyte.

The following description presents a detailed method, by way of example, of the application of the invention in the manufacture of manganese-dioxide cells of the MSC 12 type, the standard diameter in such case of the zinc can or container being 19.2 mm. and that of the mix core (with the carbon rod) being 16 mm.

In practicing this invention in such an instance, a selected original diameter of the zinc can or container shell is about 20.7 mm. and similarly the core has a selected diameter of about 18 mm. Both the zinc can and the core are preferably otherwise of the conventional nature and composition, and the core just emerging from the usual holding machine approximates a weight of 21.5 g. The mix has been dried as is conventional until it is as hard as dry clay and has been brushed in order to rid it of brittle particles and to obtain a relatively smooth surface.

In the zinc can, a bottom washer made of an insulating material is placed, and one or more paper sheets are applied against the inner wall of the zinc can, said sheets being coated with dry electrolytic paste and being used as separator. The core is placed in the zinc can after its bottom part has been provided with a thin kraft paper cup so that the core is well centered in the zinc can.

Then, the zinc can is compressed so that its diameter is reduced to the standard dimension of 19.2 mm.±0.1 mm.

The can is reduced by cold pressure i.e. cold-pressed. This operation may be effected by forcing or pushing, the cell through a tapered die, the inlet diameter thereof being about 20 mm. and the outlet diameter being about 19 mm. The cell thereupon becomes elongated slightly to the extent of about 1 mm. and in view of this phenomenon, a suitable depth e.g. 59 mm. is chosen for the zinc can.

As shown in FIGURE 1, an apparatus for effecting the required dimensional changes in the cell is constituted by a steel plate fashioned as a one-piece die 1 which is anchored on a base 2. The one-piece die 1 comprises two parts; the head part 3' constituting a guide provided with a cylindrical hole having a 20 mm. diameter (in the case of MSC 12 cells) and a length greater than that of the desired cell; the second part 3 which constitutes the real die, has an inlet diameter of about 20 mm. and an outlet diameter of about 19 mm. the length being about 5 cm. The plunger P which serves to push the cell 4 through, is a spring split tube type, e.g. a relatively thin walled tube T, the normal outer diameter of which is approximately 20 mm. and which is slit at S a generatrix, for about half its length. In this way, the tube T which pushes the zinc cup as a piston would, by exerting a pressure on the edges of the zinc can, is able to push the cell through the tapered die by yielding radially and to eject it. It is quite obvious that the invention is not limited to such a device and that any other system, causing advancement of the cell assembly through the die and the required compression of the zinc can may well be used without departing from the invention. (For example, hydraulic pressure of liquids e.g. electrolyte directed against the cell assembly within the die might be utilized both for cell advancement and its impregnation with requisite electrolyte.)

This cell advancement has the effect of compressing the depolarizer at the same time, in its whole mass, i.e. of creating both a uniformly distributed compression and a close engagement between the carbon rod and the depolarizing mix, without any sliding tendency along the carbon rod. As to the mix weight, it has the highest possible value (21.5 g.); as a comparison in the processes now in use the said weight is about 16 g.

During this compressing process, no slippage or sliding is occasioned between the paper and the core, so that any risk of tearing the paper is obviated; as to the slack between the core and the zinc can, it is reduced to a few tenths of a millimeter.

The cell requires activation with electrolyte before it can be utilized. If electrolyte is not incorporated during the compression stage as suggested above, it must be added subsequently, for example subsequent to said stage. In the latter event, after the compressing operation, the cell is activated by introducing electrolyte in any of several ways; this impregnation may be made under a vacuum after pouring the determined amount of electrolyte into the zinc can above the depolarizer either all at once, or in two or several operations; or it may be made by injecting the same amount of electrolyte, the cell being first closed by a disk made of a soft insulating plastic material, provided with at least two apertures.

In another embodiment of the invention, a core with a hollow carbon rod may be used, said hollow carbon rod being provided with apertures and the impregnation of electrolyte being made by introducing the given amount of electrolyte through the carbon rod; this operation may be made by suction of the electrolyte contained in a can by way of the hollow carbon rod or by injecting the electrolyte by means of a hollow needle penetrating in the central hole of the carbon rod through a rubber or rubber-like wafer held by a cap provided for the carbon rod.

FIGURES 2 to 5 of the drawings are diagrammatical sections of several embodiments of devices for activating a cell.

Referring to FIGURE 2, the cell 4a containing a determined amount of electrolyte 5 above the depolarizing mix is placed in an enclosure 6 provided with an aperture 7 connecting the enclosure with a vacuum-pump. The vacuum promotes the elimination of bubbles and the penetration of the electrolyte in the mix. The complete impregnation is made in one or several stages.

Referring to FIGURE 3, the cell 4b is closed by a sealing disc 8 made of a soft plastic material such as polyethylene, this disc is perforated in at least two places, one of the holes 9 being used for injecting the determined amount of electrolyte, the other one 10 for the egress of gases. At the end of the impregnation, the holes are plugged or stopped up by heating or otherwise.

Referring to FIGURE 4, the cell 4c comprises instead of a solid carbon rod as in FIGURES 1 to 3, inc. a tubular carbon rod 11 provided with small apertures 13; the cell provided with a closing disc is positioned upside down in the vacuum enclosure 6c above a small reservoir or can 12 containing electrolyte, in which is dipped the outer end 11c of the carbon rod. When a vacuum is created, the depolarizing mix and the separator become saturated with electrolyte from the reservoir.

With a cell 4d which resembles cell 4c, the electrolyte filling operation may be different, as is shown in the embodiment of FIGURE 5; therein the tubular carbon rod 11d is closed at its outer end 11e as by a rubber wafer 14 maintained under a cap 15, said cap being centrally apertured at 15d. The cell 4d is activated as by means of a hypodermic syringe 16 which is caused to penetrate the rubber wafer 14 into the cavity of the carbon rod 11d from which the electrolyte is distributed under pressure of the hypodermic syringe (not shown) via the apertures 13d in rod 11d to the mix.

The following results have been obtained with MSC 12 cells under like operating conditions of continuous discharge through a 6.66 ohms resistor:

Original cell, voltage, 1.6 v.;
End of useful life voltage 0.8 v.;
Discharge time:
 MSC 12 extant with cold gellified electrolyte; average 5 hrs. 6 min.
 MSC 12 made according to the present invention; average 7 hrs. 12 min.

The present invention provides a process for manufacturing a cylindrical dry cell, more especially a cell provided with a depolarizing mix comprising manganesedioxide center-positioned and insulated from the bottom of the zinc can and separated from the can walls by an electrolyte impregnated sheet, a process in which use is made of a zinc can the diameter of which is larger than the standard diameter and of a dry smooth surfaced mix, the diameter of which is larger than the standard diameter, and a process in which the diameter of the zinc can is cold-pressed down to the standard diameter and in which the mix is impregnated with a determined amount of electrolyte either under a vacuum or by injection.

According to the invention, the pressing down of the zinc can can be cold and may be obtained by pushing the cell in a non-activated state through a tapered die of a suitable calibration. In another embodiment, the electrolyte impregnant under pressure may be utilized for pushing the cell through the tapered die and simultaneously impregnating the mix.

While the invention has been described specifically for illustrative purposes to its practice with MSC 12 type cells, its application to similar cells of other dimensions is obvious. Likewise although specific procedure has been described and illustrated, variations therein within the scope of the appended claims are possible and are contemplated. There is no intention therefore, of limitation to the exact disclosure herein made.

What is claimed is:

1. In the manufacture of primary cells having a conductive electrode-functioning container and a core including a depolarizing mix, the steps of loading a required quantity of depolarizing mix into the said container whose dimensions exceed the ultimately desired dimensions of the cell, in which a carbon rod is positioned in substantially axial position, and in which insulating material has been positioned for separating the said container from the depolarizing mix, and then reducing the dimensions of the said container by cold compression to the ultimately desired dimensions of the cell, and so as to cause the depolarizing mix to be compressed in the space between said carbon rod and the inner surface of said container.

2. In the manufacture of primary cells having a conductive electrode-functioning container and a core including a depolarizing mix, the steps of loading a required quantity of depolarizing mix into a container shell whose cross-sectional major chord or diameter is greater than the ultimately desired such dimension of the said container after completion of the cell's manufacture, and a carbon rod in substantially axial position after insulating material has been positioned for separating the said container from the depolarizing mix, the crosssectional boundary and area of the said container shell then being reduced in dimension by cold compression causing the depolarizing mix to be compressed in the space between the said carbon rod and inner surface of the said container, and then impregnating said depolarizing mix with electrolyte.

3. In the manufacture of primary cells having a conductive electrode-functioning cylindrical container and a core including a depolarizing mix, the steps of loading a required quantity of depolarizing mix into a container shell whose diameter is greater than the ultimately desired diameter of the said container after completion of manufacture, and a carbon rod in substantially axial position, after insulating material has been positioned for separating the said container from the depolarizing mix, then reducing the cross-sectional boundary and area of the said container shell in dimension by cold compression thus causing the depolarizing mix to be compressed in the space between the said carbon rod and inner surface of the said container, and then impregnating said depolarizing mix with electrolyte in a vacuum.

4. In the manufacture of primary cells having a conductive electrode-functioning container and a core including a depolarizing mix, the steps of loading a required quantity of depolarizing mix into a container shell whose cross-sectional major chord or diameter is greater than the ultimately desired such dimension of the said container after completion of manufacture, and a carbon rod in substantially axial position after insulating material has been positioned for separating the said container from the depolarizing mix, then reducing the cross-sectional boundary and area of the said container shell in dimension by compression causing the depolarizing mix to be compressed in the space between the said carbon rod and inner surface of the said container, then closing the opening of said container by a seal having two or more apertures, then injecting electrolyte under pressure through one or more of said apertures to impregnate the depolarizing mix, and thereafter sealing the apertures.

5. In the manufacture of a primary cell having a conductive electrode-functioning container and a core including a depolarizing mix, the steps of loading a required quantity of depolarizing mix into a container shell whose cross-sectional major chord or diameter is greater than the ultimately desired such dimension of the said container after completion of manufacture, and a carbon rod in substantially axial position after insulating material has been positioned for separating the said container from the depolarizing mix, then reducing the cross-sectional boundary and area of the said container in dimension by cold compression in a cold die, by inserting the said container shell into and along a guide channel of the same cross-sectional dimensions of said container shell for a distance greater than the length of the said container shell and then through a narrowing tapered portion of said cold die by a ram only contacting the sectional periphery of said container shell, said compression causing the depolarizing mix to be compressed in the space between the said carbon rod and inner surface of the said container, and then impregnating said depolarizing mix with electrolyte.

References Cited in the file of this patent
UNITED STATES PATENTS

| 1,552,395 | Deibel et al. | Sept. 1, 1925 |
| 1,564,951 | Olaneta | Dec. 8, 1925 |
| 2,649,491 | Lang | Aug. 18, 1953 |
| 2,931,849 | Burrell | Apr. 5, 1960 |

FOREIGN PATENTS

| 29,138 1904 | Great Britain | Oct. 19, 1905 |